Sept. 4, 1962   E. SCHNITZER   3,052,458
BAND PASS SHOCK STRUT
Original Filed May 15, 1956   2 Sheets-Sheet 1

INVENTOR
EMANUEL SCHNITZER
BY
ATTORNEYS

Sept. 4, 1962 E. SCHNITZER 3,052,458
BAND PASS SHOCK STRUT
Original Filed May 15, 1956 2 Sheets-Sheet 2

INVENTOR
EMANUEL SCHNITZER

BY
J. O. Tresansky
ATTORNEYS

United States Patent Office 3,052,458
Patented Sept. 4, 1962

3,052,458
BAND PASS SHOCK STRUT
Emanuel Schnitzer, 822 19th Place, Newport News, Va.
Original application May 15, 1956, Ser. No. 585,128, now Patent No. 2,934,175, dated Apr. 26, 1960. Divided and this application Nov. 17, 1959, Ser. No. 853,663
10 Claims. (Cl. 267—9)
(Granted under Title 35, U.S. Code (1952), sec. 266)

The invention described herein may be manufactured and used by or for the Government of the United States of America for governmental purposes without the payment of any royalties thereon or therefor.

This invention relates to band pass shock absorbers and, more particularly, to shock absorbers of this type which function successfully to absorb shock forces operating in either or both of two opposed directions.

This is a divisional application of my copending application Serial No. 585,128, filed May 15, 1956, now U.S. Patent No. 2,934,175, issued April 26, 1960 which in turn is a continuation-in-part of my application Serial No. 528,563, filed August 15, 1955, now U.S. Patent No. 2,866,633, issued December 30, 1958, wherein a single action band pass shock absorber was shown and described in which telescoping cylinders containing a fluid and appropriate valves were interposed between a force and a mass, as between the body and wheel of an airplane; the fluid flow between cylinders being so controlled that, for interactions between the body and wheel of a selected band of frequencies, the absorber behaved as the conventional cylinder fluid piston absorber, but for other selected frequency bands the absorber filtered out the shock disturbance, thus preventing injurious body shocks.

While such a single action absorber has wide uses, particularly in the field of vehicles, for certain conditions, as in many machine applications, it is desirable that the shock absorber between massive parts be double acting.

It is, therefore, an important object of the present invention to provide shock absorber structure which will act with equal or proportional facility in opposite directions of movement between opposing forces.

An object, also, is to provide double acting shock absorber mechanism which may be made normally operable for selected bands of frequencies but capable of attenuating shocks of frequencies external to the selected bands.

An additional object of the invention is to provide double acting shock absorbing mechanism which is not only selective as to shock frequency but is capable of adjustment as to amount of damping and phase so that mechanism adequate to the specific mechanical problem may be built into the equipment.

An object, also, is the provision of frequency discriminating shock absorbers utilizing mechanical friction or electro-magnetic types of damping, or of damping control.

Other objects pertain to the provision of a shock absorber with means for sensing the instantaneous difference between the input and output loading functions of the absorber, and transmitting this difference as a workable signal to be utilized for damping control; the provision of means for modifying a given selected group of frequencies, as by filtering, so that the desired type of damping characteristic can be developed; and the provision of means for amplifying or converting the transmitted signal to the proper form for damping control.

Other objects and many of the attendant advantages of this invention will be readily appreciated as the same becomes better understood by reference to the following detailed description when considered in connection with the accompanying drawings wherein.

Figure 1:
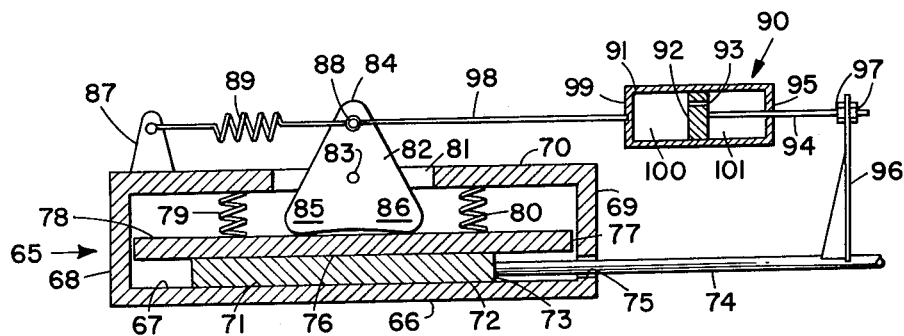
FIG. 1 is a view in section of a high pass shock absorber using friction forces between the coacting moving objects.

Reference is made to FIG. 1 for illustration of friction apparauts for double-action control of shock between movable bodies or objects. In this figure is shown a receiver shaped as a strut in the form of a flattened rectangular box 65 having a flat base 66, the upper surface of which serves as a friction surface 67, side walls 68 and 69, and top wall 70. Slidably movable in said box 65 is a plunger 71, the lower surface 72 of which is adapted to engage the friction surface 67 of box base 66. At one edge 73 of this plate a plunger rod 74 is attached which projects externally of the box through box side opening 75. Above plunger 71, which is in the form of a flat plate having friction surfaces 72 and 76, is a third friction plate 77, this plate being free to move up and down but restrained from side movement by the box walls, a friction surface 76 being formed on the lower plate surface. Coil springs 79 and 80 extending between the plate 77 and top wall 70 of the box adjacent the plate ends serve normally to reduce the friction load on plunger 71 due to the weight of plate 77.

In a slot 81 formed in the center of box top 70, a cam 82, of approximately triangular shape, is mounted for pivotal movement on pin 83, extending between the slot edges. This cam 82 is of such size that when the line through the cam pivot pin 83 and apex 84 is vertical the other two apexes 85 and 86 rest on friction plate 77 against the slight tension of springs 79 and 80 and plunger 71 has minimum frictional contact with this plate and base plate 66. As shown, the lower apexes 85 and 86 are rounded to permit easy camming action against plate 77 on cam rotation.

A spring connection lug 87 is formed adjacent one end of the box top 70 and between this lug and a pin 88 in cam apex 84 a combined tension and compression spring 89 is placed. In line with this spring on the opposite side of the apex, and in the plane of movement of the cam is a control unit 90. This unit includes a cylinder 91 closed at both ends, and a piston 92 movable therein, the cylinder being filled with a fluid and the piston having a duct or orifice 93, of small diameter relative to the size of the piston, passing through the piston to permit transfer of fluid from one side of the piston to the other on piston movement. A piston rod 94 connects the piston through cylinder end wall 95 to a standard 96 to which it is fixed as by screw nuts 97, the standard at its base being attached to and movable with the plunger rod 74. The rod 98 connects cam pivot pin 88 to cylinder end 89. In operation, the plunger rod 74 is fixedly secured to one movable object and the friction box 65 to the other relatively movable object.

The arrangement of FIG. 1 is adapted for use as a high band pass shock absorber. If a low rate of loading be assumed in such direction that plunger 71 is pushed toward the friction box, the plunger connected piston rod 94 moves the piston 92 to the left at such a slow rate that fluid is able to pass from region 100 to region 101 through duct 93 with negligible restraint, an ineffective amount of force being transmitted to the cylinder and to connected cam 82. As a result, spring 89 holds cam 82 in the neutral, low friction position and the shock absorber, therefore, does not transmit or damp the load pulse. On the other hand, where there is a high rate of loading, fluid cannot bleed through orifice 93 fast enough to prevent the approach of a locked condition between the cylinder and piston, resulting in cam actuation to increase the compression and resulting frictional force between the friction plates 66 and 77 and plunger 71. When the direction of motion is reversed the cam action is reversed with the same effects. In cases where the frequency range of load application is very large, it may be necessary to insert a combined compression tension spring between rod 98 and cam 82, of the type shown in FIG. 2 with relatively greater stiffness than that of spring 89, to prevent the establishment of large forces in the control system of this type of shock absorber.

Figure 2:
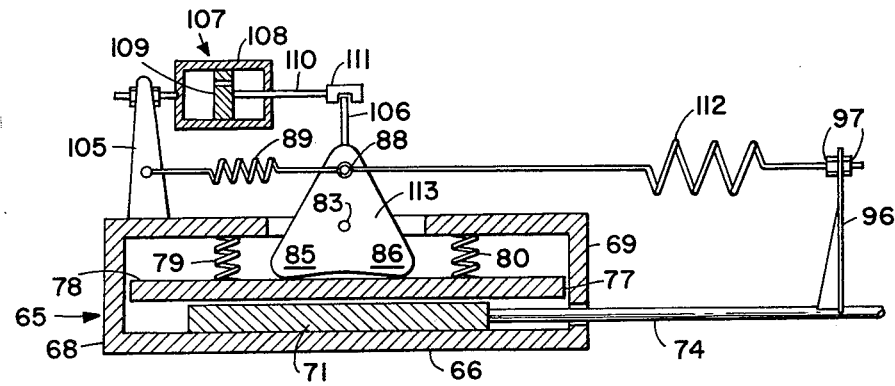
FIG. 2 is a modification of the friction arrangement of FIG. 1 suitable for use for low band pass absorption.

The high band pass shock absorber of FIG. 1 may be converted to a low pass absorber in several ways. One example is shown in FIG. 2 where the spring lug 87 of FIG. 1 is enlarged to form the lug 105 of FIG. 2 and the cam apex 84 of FIG. 1 is extended by stem 106 in FIG. 2 in cam 113 to form terminal connections for the control unit 107 of the type shown as 90 in FIG. 1. As shown, a cylinder 108 with closed ends has one end fixed to lug 105 and an apertured piston 109 is connected by piston rod 110 and pivotal connection 111 to the cam stem 106. Also, in place of control unit 90 between the cam and plunger a stiff spring 112, as referred to hereinabove in connection with FIG. 1, is inserted. The spring 89 and friction plunger receiver unit remain the same as in FIG. 1. With this arrangement, at low frequencies the control unit acts as an open link, leaving the cam free to move and thus causing shock absorption whereas at high frequencies the control unit approaches a locked condition so that the cam remains in its neutral low friction producing position.

Figure 3:
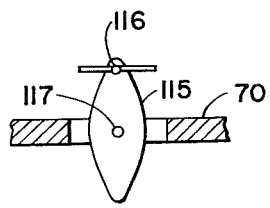
FIG. 3 is a detail of a varied cam structure applicable to the arrangement of FIG. 1 to obtain low band pass absorption.

An alternative method for converting the arrangement of FIG. 1 to a low pass absorber is to replace cam 82 by cam 115, as shown in FIG. 3; this cam being of approximate elliptical form with the spring 89 and control rod 98 connected to pivot pin 116 at the top focal section, the cam being pivotally mounted in the box top by pin 117 at the cam center. The normal position of this cam is with its long axis vertical so that there is maximum friction between the plunger and receiver elements, and it is maintained in this position during low frequency pulses as will appear from the description of FIG. 1. At high frequency pulses, however, the cam is rotated thus attenuating the shock.

Figure 4:
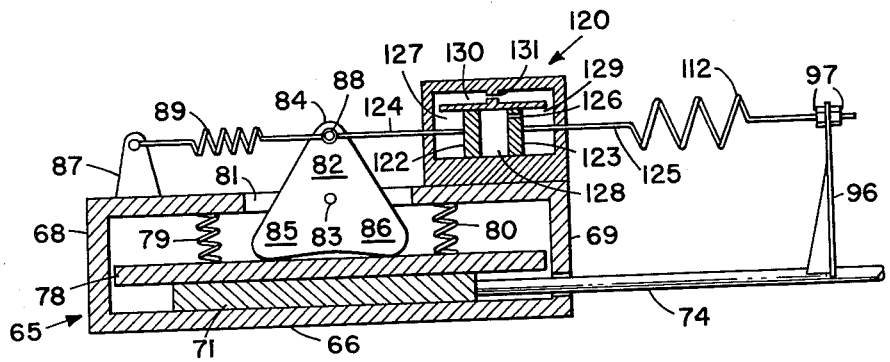
FIG. 4 illustrates a structural modification of the shock absorber of FIG. 1 suitable for an intermediate band pass shock absorber.

FIG. 4 illustrates a modification of FIG. 1 for application to intermediate frequency pulsations. In this arrangement the parts are identical to those of FIG. 1 with the exceptions that the control unit 90 is replaced by a modified control unit 120 and spring 112, which is stiff in comparison with spring 89, connected in series relation between the cam pivot pin 88 and plunger standard 96. In this construction the control unit 120 is provided with two pistons, 122 and 123, piston 122 connecting with pivot 88 by rod 124 and piston 123 connecting with the spring 112 by means of rod 125, the spring connecting to standard 96. Piston 122 is free of openings while piston 123 is provided with an aperture 126. The two pistons divide the piston space into three regions indicated at 127, 128 and 129, regions 127 and 129 being connected by the passage 130. A restrictive aperture 131 in this passage offers less impedance to fluid flow between regions 127 and 129 than the impedance offered by duct 126 in piston 123.

In using this apparatus for low frequencies, fluid flows easily through duct 126 so that negligible force is exerted on piston 122 and spring 89 is able to maintain cam 82 in its neutral low friction position. For intermediate frequencies, duct 126 permits a fluid flow which is small for the pressures exerted and hence piston 122 is actuated since liquid can flow through passage 130. For high frequencies, both apertures 126 and 131 offer high impedance to fluid flow so that no motion of cam 82 can occur.

Figures 5, 7:
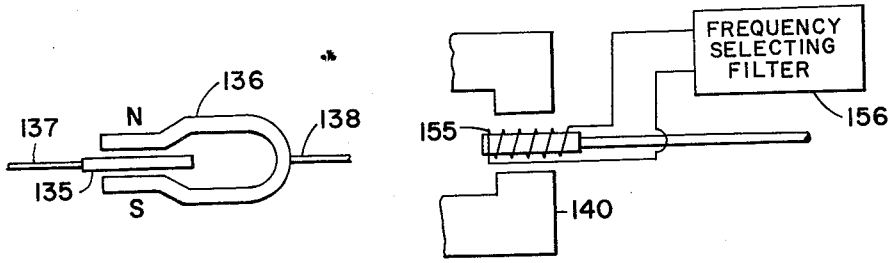
FIG. 5 is a detail illustrating the application of electromagnetic means to selective shock absorption.

The general method of damping control for shock absorbers as previously described lends itself, also, to electromagnetic methods. FIG. 5 illustrates one method of power translation of this type wherein a low resistance non-magnetic electrically conducting bar 135 is adapted for movement between the poles of a permanent magnet 136. At low frequencies the magnetic drag on bar 135 is small so that relatively little coupling exists between plunger 137 and receiver 138; while at high frequencies the coupling is much tighter so that rods 137 and 138 are almost rigidly connected. This is due to the fact that, proportional to the relative velocity, eddy currents are set up in the bar producing a magnetic force opposing relative motion between the bar and magnet. The arrangement of FIG. 6 utilizes this principle in the electromagnet 140, having adjacent pole ends 141 and a low resistance non-magnetic electrically conducting bar 142 slidably mounted between said poles. A non-magnetic support rod 145 is fixed to the electromagnet, the rod at its end being attached to the highly permeable core 146 of the coil 147 forming part of a shock rate of application and frequency sensing element 148. This core, which may be cylindrical in shape, is normally positioned between the poles of permanent magnet 149. The terminals of coil 147 are connected to a filter network 150 which is adjustable according to known procedures to pass desired frequencies. The signal input generated in coil 147 and filtered in network 150 is then fed into the amplifier 144. The electromagnet 140 comprises the plate load of the amplifier circuit, which in the absence of an alternating current signal from filter network 100 applies a unidirectional current of a predetermined amplitude to the electromagnet. Upon the application of a filtered alternating current signal, generated by relative movement of coil 147 and permanent magnet 149, the unidirectional current supplied to electromagnet 140 is correspondingly varied, thereby modulating the electromagnetic effects between magnet 140 and bar 142. Thus by adjustment of filter components any desired damping effects may be obtained.

Figure 6:
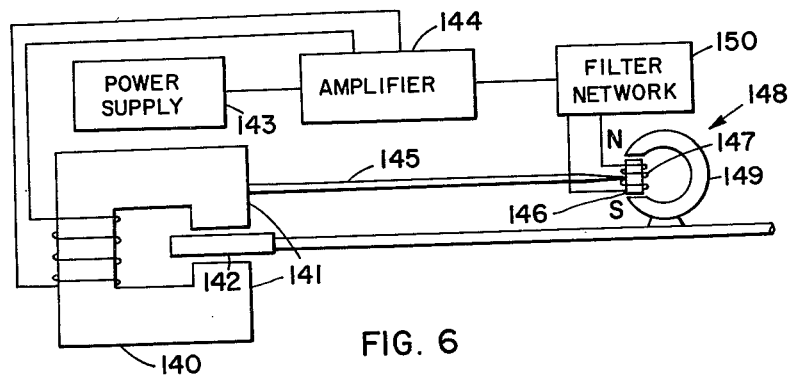
FIG. 6 is a further modification showing use of electromagnetic means to absorb shock in selected frequency bands; and, FIG. 7 is a variation on the arrangement of FIG. 6.

It is also possible to simplify the shock absorber or vibration damper of FIG. 6 by substituting a permanent magnet for electromagnet 140 and a wire wound armature with a highly permeable core for the bar 142 with a frequency selective type of short circuiting filter network connected across the armature terminals. In this way, the motion pickup amplifier and power source, including elements 143 through 150 of FIG. 6, may be omitted, the arrangement being shown in FIG. 7, where the armature and filter are indicated by numerals 155 and 156, respectively. With this revised construction for the forcing frequency ranges in which the filter approaches a short circuit or low electrical impedance, the circulating current in the armature winding induced by the relative motion between armature and permanent magnet would create a damping force opposing the motion. Over the remainder of the frequency spectrum, the filter would present a high impedance, reducing the armature current to such a low value that relatively little damping force would be exerted between the permanent magnet and aramture.

Obviously many modifications and variations of the present invention are possible in the light of the above teachings. It is therefore to be understood that within the scope of the appended claims the invention may be practiced otherwise than as specifically described.

I claim:
1. A double acting shock absorber connectible between two relatively movable objects subject to force applica- tions, comprising a receiver adapted to be attached to one of said objects and an elongate plunger having a first end adapted to be attached to the other of said objects, said plunger being in contiguity with said receiver and the positional relationship of said plunger and receiver being directly variable with the relative interaction of said movable objects; said receiver being in the form of a strut having at least a pair of spaced flat facing elements disposed mutually parallel to the longitudinal axis of said plunger, the second end of said plunger being in the form of a flat slide positioned between said facing elements and movable in contacting relationship between said elements, frictional damping forces interacting between said facing elements and said slide thereby effecting damping upon movement of said plunger relative to said receiver; damping force modifying means comprising a cam pivotally mounted in fixed relation to said strut and movable against one of said facing elements to modify the frictional force between said slide and said facing elements; control means positioned exteriorly of said receiver including two relatively movable control elements, means operatively coupling one of said relatively movable control elements with one of said relatively movable objects for developing a force differential between said two control elements upon relative movement of said objects in either direction within a preselected range of rate of change of force applications; and means operatively coupling the other of said control elements to said modifying means for transferring said force differential to said modifying means; said modifying means being adapted to transform said force differential into forces summative with said interacting damping forces, whereby said damping effect is modified on relative movement of said objects in either direction within said preselected range of rate of change of force applications.

2. The double acting shock absorber as defined in claim 1 with said control means comprising a closed control cylinder containing fluid connected to said cam, a control piston slidably movable in said cylinder, and a piston rod attached to said piston and connected to said plunger for movement therewith.

3. The double acting shock absorber as defined in claim 2 with said cam having an approximate triangular form with one angular apex projecting from the cam support for pivotal engagement with said control cylinder connection, and the other apexes normally in pressure contacting relation to said slide; and a spring extending between said one cam apex and a point of support on said strut for filtering in conjunction with said piston and cylinder shock movements passing through said absorber.

4. The double acting shock absorber as defined in claim 2, with said control means including a aperture formed through said control piston.

5. The double acting shock absorber as defined in claim 2 with said cam having the approximate form of an ellipse, one focal section of said cam being normally in pressure contacting relation to said slide and the other focal section of said cam forming a point of connection to said control cylinder; and a spring connecting said other cam focal section to said strut.

6. The double acting shock absorber as defined in claim 4, with said control means comprising a spring connected between a stationary support on said strut and said cam in opposition to said control cylinder-cam connection.

7. A double acting high band pass shock absorber adapted for connection between movable objects which are subject to shock force applications, comprising a plate connectible to one of said objects and having a friction surface thereon; a plunger having an end connectible to the other of said objects and having a friction head normally resting on said plate and provided with upper and lower friction areas; a friction strip mounted on the upper side of said plunger strip; a support element connected to said plate and having a section extending over said friction strip; a cam of triangular configuration pivotally mounted on said support element and having two apexes thereof normally engaging said friction strip and the third apex extending above said support element; a yielding connection between said third cam apex and said plunger end connectible to said other object lying parallel to the plane of said cam movement; and means in said yielding connection operable only on high frequency pulses between said objects for locking said yielding connection and moving said cam to compress the friction strip, plunger head and friction plate into frictional contact, thereby increasing the resistance offered by said shock absorber to high frequency pulses between said objects.

8. A double acting low band pass shock absorber adapted for connection between movable objects which are subject to shock force applications, comprising a plate connectible to one of said objects and having a friction surface thereon; a plunger having an end connectible to the other of said objects and having a friction head normally resting on said plate and provided with upper and lower friction areas; a friction strip mounted on the upper side of said plunger strip; a support element connected to said plate and having a section extending over said friction strip; a cam of elliptical configuration pivotally mounted on said support element and having one focal section thereof normally engaging said friction strip and the other focal section extending above said support element; a yielding connection between said other focal section and said plunger end connectible to said other object lying parallel to the plane of said cam movement; and means in said yielding connection operable only on high frequency pulses between said objects for locking said yielding connection and moving said cam to release the frictional pressure between said friction strip, plunger head and friction plate, whereby shock oscillations or pulses of high frequency are transmitted at reduced magnitude.

9. The double acting shock absorber as defined in claim 1 wherein said cam is of substantially triangular configuration having two apexes thereof normally engaging the outer surface of said one of said facing elements and the third apex extending outwardly from said receiver, said receiver being provided with a support element connected thereto and extending outwardly therefrom, said means operatively coupling said one of said relatively movable control elements with one of said relatively movable objects comprising a rigid connecting member connected between said one control element and said support element, said means operatively coupling said other of said relatively movable control elements to said cam modifying means comprising a rigid connecting member connected between said other of said control elements and said third cam apex, an elastic connection between said third cam apex and said support element, and an elastic connection between said third cam apex and said plunger end connectible to said other object having a greater resistance to distortion than said first named elastic connection.

10. The double acting shock absorber as defined in claim 1 wherein said cam is of substantially triangular configuration having two apexes thereof normally engaging the outer surface of said one of said facing elements and the third apex extending outwardly from said receiver and wherein said control means including two relatively movable control elements comprises a fluid filled piston chamber exteriorly mounted on said receiver between said third cam apex and said plunger end connectible to said other object, a solid piston head movable in said chamber, a piston head having an aperture therethrough movable in said chamber in opposed relation to said solid piston head, and a passage having a restrictive aperture therein connecting the chamber regions between the piston heads and the adjacent chamber walls, said means operatively coupling said one of said relatively movable control elements with one of said relatively movable objects comprising a resilient rod connecting said apertured piston head to said plunger end connectible to said other object, said means operatively coupling said other of said relatively movable control elements to said cam modifying means comprising a rigid rod connecting said solid piston head to said third cam apex and a resilient rod connecting said third cam apex to a support element mounted on said receiver.

References Cited in the file of this patent

UNITED STATES PATENTS

| | | |
|---|---|---|
| 1,121,315 | Williams | Dec. 15, 1914 |
| 1,671,658 | Travers | May 29, 1928 |
| 2,212,426 | Mitereff | Aug. 20, 1940 |
| 2,836,986 | Kretz | June 3, 1958 |
| 2,846,028 | Gunther | Aug. 5, 1958 |
| 2,996,267 | Warren | Aug. 15, 1961 |